(12) United States Patent
Bajic et al.

(10) Patent No.: US 12,050,913 B2
(45) Date of Patent: *Jul. 30, 2024

(54) PROCESSING CORE WITH META DATA ACTUATED CONDITIONAL GRAPH EXECUTION

(71) Applicant: Tenstorrent Inc., Toronto (CA)

(72) Inventors: Ljubisa Bajic, Toronto (CA); Milos Trajkovic, Toronto (CA); Ivan Hamer, Toronto (CA)

(73) Assignee: Tenstorrent Inc., Toronto (CA)

( * ) Notice: Subject to any disclaimer, the term of this patent is extended or adjusted under 35 U.S.C. 154(b) by 172 days.

This patent is subject to a terminal disclaimer.

(21) Appl. No.: 17/080,433

(22) Filed: Oct. 26, 2020

(65) Prior Publication Data

US 2021/0042118 A1 Feb. 11, 2021

Related U.S. Application Data

(63) Continuation of application No. 15/963,315, filed on Apr. 26, 2018, now Pat. No. 10,817,293.

(Continued)

(51) Int. Cl.
*G06F 9/30* (2018.01)
*G06F 9/448* (2018.01)
(Continued)

(52) U.S. Cl.
CPC ........ *G06F 9/30072* (2013.01); *G06F 9/3001* (2013.01); *G06F 9/4494* (2018.02);
(Continued)

(58) Field of Classification Search
CPC ................................................ G06F 9/30072
(Continued)

(56) References Cited

U.S. PATENT DOCUMENTS 4,660,166 A 4/1987 Hopfield
4,751,572 A 6/1988 Baumbaugh et al.
(Continued)

FOREIGN PATENT DOCUMENTS

EP 1328096 A2 7/2003
EP 1193502 A3 6/2005

OTHER PUBLICATIONS

S. Zhang et al., "Cambricon-X: An accelerator for sparse neural networks," 2016 49th Annual IEEE/ACM International Symposium on Microarchitecture (MICRO), Taipei, Taiwan, 2016, pp. 1-12, doi: 10.1109/MICRO.2016.7783723. (Year: 2016).*

(Continued)

*Primary Examiner* — James D. Rutten
(74) *Attorney, Agent, or Firm* — Daylight Law, P.C.

(57) ABSTRACT

A processing core for the efficient execution of a directed graph is disclosed. The processing core includes a memory and a first and a second data tile stored in the memory. The first and second data tiles include a first and a second set of data elements stored contiguously in the memory. The processing core also includes metadata relationally stored with the first data tile in the memory. The processing core also includes an execution engine, a control unit, and an instruction. Execution of the instruction uses the execution engine, a first data element in the first set of data elements, and a second data element in the second set of data elements. The control unit conditions execution of the instruction using the metadata. A standard execution of the instruction generates a standard output. A conditional execution of the instruction operation generates a conditionally executed output.

31 Claims, 7 Drawing Sheets

Related U.S. Application Data

(60) Provisional application No. 62/491,767, filed on Apr. 28, 2017.

(51) Int. Cl.
    *G06N 3/04* (2023.01)
    *G06N 3/045* (2023.01)
    *G06N 3/063* (2023.01)
    *G06N 3/08* (2023.01)

(52) U.S. Cl.
    CPC .............. *G06N 3/04* (2013.01); *G06N 3/045* (2023.01); *G06N 3/063* (2013.01); *G06N 3/08* (2013.01)

(58) Field of Classification Search
    USPC .......................................................... 706/16
    See application file for complete search history.

(56) References Cited

U.S. PATENT DOCUMENTS

| | | | |
|---|---|---|---|
| 5,087,826 A | 2/1992 | Holler | |
| 5,164,938 A | 11/1992 | Jurkevich et al. | |
| 5,329,611 A | 7/1994 | Pechanek et al. | |
| 5,465,368 A | 11/1995 | Davidson | |
| 5,483,620 A * | 1/1996 | Pechanek | G06N 3/10 706/41 |
| 5,828,858 A | 10/1998 | Athanas et al. | |
| 6,334,121 B1 | 12/2001 | Primeaux et al. | |
| 6,745,384 B1 | 6/2004 | Biggerstaff | |
| 7,164,422 B1 | 1/2007 | Wholey, III et al. | |
| 7,986,654 B1 * | 7/2011 | Giallorenzi | H04B 1/7105 370/335 |
| 8,736,624 B1 | 5/2014 | Mahan et al. | |
| 8,738,860 B1 | 5/2014 | Griffin | |
| 2003/0120475 A1 * | 6/2003 | Nakamura | G06F 30/30 703/22 |
| 2005/0253861 A1 * | 11/2005 | Hutchins | G06T 15/005 712/E9.021 |
| 2006/0149921 A1 | 7/2006 | Lim | |
| 2006/0294150 A1 | 12/2006 | Stanfill et al. | |
| 2009/0070567 A1 * | 3/2009 | Calder | G06F 9/3846 712/E9.045 |
| 2012/0017066 A1 * | 1/2012 | Vorbach | G06F 15/7867 712/E9.003 |
| 2012/0303933 A1 | 11/2012 | Manet | |
| 2013/0205123 A1 | 8/2013 | Vorbach | |
| 2014/0366033 A1 | 12/2014 | Nystad | |
| 2015/0192950 A1 | 7/2015 | Tubbs | |
| 2016/0162402 A1 | 6/2016 | Woolley | |
| 2016/0210723 A1 | 7/2016 | Yang | |
| 2016/0246599 A1 * | 8/2016 | Johnson | G06F 9/3016 |
| 2016/0358068 A1 | 12/2016 | Brothers et al. | |
| 2017/0083431 A1 | 3/2017 | Burger | |
| 2017/0200094 A1 * | 7/2017 | Bruestle | G06N 3/08 |
| 2018/0121196 A1 * | 5/2018 | Temam | G06F 9/3001 |
| 2018/0121786 A1 | 5/2018 | Narayanaswami et al. | |
| 2018/0218518 A1 | 8/2018 | Yan et al. | |

OTHER PUBLICATIONS

Parashar et al. 2017. SCNN: An Accelerator for Compressed-sparse Convolutional Neural Networks. SIGARCH Comput. Archit. News 45, 2 (May 2017), 27-40. https://doi.org/10.1145/3140659.3080254 (Year: 2017).*
Extended European Search Report dated Mar. 12, 2021 from European Application No. 18791269.6, 13 pages.
Rahimi Abbas et al., "Circa-GPUs: Increasing Instruction Reuse Through Inexact Computing in GP-GPUs", IEEE Design & Test, IEEE, vol. 33, No. 6, Dec. 11, 2016, pp. 85-92.
Notice of Allowance dated May 13, 2021 from U.S. Appl. No. 16/153,991, 35 pages.
Second Examination Report dated Apr. 29, 2022 from European Application No. 18791269.6, 6 pages.
Nonfinal Office Action mailed Dec. 24, 2020 from U.S. Appl. No. 16/153,991, 81 pages.
First Examination Report dated Dec. 9, 2021 from European Application No. 18791269.6, 6 pages.
A. Almahairi, et al., Dynamic Capacity Networks, arXiv:1511.07838v7, May 2016.
A. Davis, et al., Low-Rank Approximations for Conditional Feedforward Computation in Deep Neural Networks, arXiv:1312.4461v4, Jan. 2014.
D. Coopersmith and S. Winograd, Matrix Multiplication via Arithmetic Progressions, J. Symbolic Computation 9, 251-280 (1990).
E. Bengio, et al., Conditional Computation in Neural Networks for Faster Models, ICLR 2016.
Final Office Action dated May 8, 2020 from U.S. Appl. No. 15/963,315, 24 pages.
International Preliminary Report on Patentability dated Nov. 7, 2019 from International Application No. PCT/IB2018/052953 filed Apr. 27, 2018, 7 pages.
J. Zhu, et al., LRADNN: High-throughput and energy-efficient Deep Neural Network Accelerator using Low Rank Approximation, Design Automation Conference, 2016 21st Asia and South Pacific, Jan. 25-28, 2016.
K. Cho, et al., Exponentially Increasing the Capacity-to-Computation Ratio for Conditional Computation in Deep Learning, arXiv:1406.7362v1, Jun. 2014.
L. Ba et al., Adaptive Dropout for Training Deep Neural Networks, Proceedings of the 26th International Conference on Neural Information Processing Systems, vol. 2, pp. 3084-3092, Dec. 5-10, 2013.
L. Denoyer, et al., Deep Sequential Neural Network, arXiv:1410.0510, Oct. 2014.
M. Denil, et al., Predicting Parameters in Deep Learning, arXiv:1306.0543v2, Oct. 2014.
M. Stollenga, et al., Deep Networks with Internal Selective Attention through Feedback Connections, NIPS, 2014, Available at: http://people.idsia.ch/~stollenga/; Accessed on: Mar. 1, 2017.
N. Shazeer, et al., Outrageously Large Neural Networks: The Sparsely-Gated Mixture-of-Experts Layer, arXiv:1701.06538v1, Jan. 2017.
Nonfinal Office Action dated Feb. 24, 2020 from U.S. Appl. No. 15/963,315, 45 pages.
Notice of Allowance dated Sep. 4, 2020 from U.S. Appl. No. 15/963,315, 17 pages.
Paul E. Utgoff. Perceptron trees: A case study in hybrid concept representations. In Proceedings of the 7th National Conference on Artificial Intelligence. St. Paul, MN, Aug. 21-26, pp. 601-606, 1988.
International Search Report dated Jul. 13, 2018 from International Application No. PCT/IB2018/052953, 10 pages.
Y. Bengio, et al., Deep Learning of Representations: Looking Forward, arXiv:1305.0445v2 , Jun. 2013.
Y. Bengio, et al., Estimating or Propagating Gradients Through Stochastic Neurons for Conditional Computation, arXiv:1308.3432v1, Aug. 2013.
Y. Bengio, et al., Representation Learning: A Review and New Perspectives, arXiv:1206.5538v3, Apr. 2014.
Examination Report from EP Application No. 18791269.6 dated Nov. 3, 2022, 14 pages.
Non-Final Office Action dated Oct. 5, 2023 from U.S. Appl. No. 17/409,577, 45 pages.
Final Office Action dated May 28, 2024 from U.S. Appl. No. 17/409,577, 20 pages.

* cited by examiner

PROCESSING CORE WITH META DATA ACTUATED CONDITIONAL GRAPH EXECUTION

CROSS-REFERENCE TO RELATED APPLICATIONS

This application is a continuation of U.S. patent application Ser. No. 15/963,315, filed Apr. 26, 2018, which claims the benefit of U.S. Provisional Patent Application No. 62/491,767, filed Apr. 28, 2017, both of which are incorporated by reference herein in their entirety for all purposes.

BACKGROUND

The recent surge in the performance of machine intelligence systems is not due to the development of revolutionary new algorithms. Indeed, the core algorithms used in machine intelligence applications today stem from a body of work that is now over half a century old. Instead, it has been improvements in the hardware and software that implement machine intelligence algorithms in an efficient manner that has fueled the recent surge. Algorithms that were once too computationally intensive to implement in a useful manner with even the most sophisticated of computers can now be executed with specialized hardware on an individual user's smart phone. The improvements in hardware and software take various forms. For example, graphical processing units traditionally used to process the vectors used to render polygons for computer graphics have been repurposed in an efficient manner to manipulate the data elements used in machine intelligence processes. As another example, certain classes of hardware have been designed from the ground-up to implement machine intelligence algorithms by using specialized processing elements such as systolic arrays. Further advances have centered around using collections of transistors and memory elements to mimic, directly in hardware, the behavior of neurons in a traditional artificial neural network (ANN). There is no question that the field of machine intelligence has benefited greatly from these improvements. However, despite the intense interest directed to these approaches, machine intelligence systems still represent one of the most computationally and energy intensive computing applications of the modern age, and present a field that is ripe for further advances.

The reason machine intelligence applications are so resource hungry is that the data structures being operated on are generally very large, and the number of discrete primitive computations that must be executed on each of the data structures are likewise immense. A traditional ANN takes in an input vector, conducts calculations using the input vector and a set of weight vectors, and produces an output vector. Each weight vector in the set of weight vectors is often referred to as a layer of the network, and the output of each layer serves as the input to the next layer. In a traditional network, the layers are fully connected, which requires every element of the input vector to be involved in a calculation with every element of the weight vector. Therefore, the number of calculations involved increases with a power law relationship to the size of each layer. Furthermore, this aspect of machine intelligence algorithms makes them difficult to parallelize because the calculations for each layer depend on the output of the prior layer.

The problems mentioned in the prior paragraph are further exacerbated by modern ANNs. Modern ANN approaches are often referred to in the industry and literature as "deep learning" approaches. This is often a reference to the substantial number of layers involved, or the complexity of the relationships between the outputs of one layer and the inputs of the other layers. For example, in a modern deep learning ANN, the outputs of a downstream layer could be fed back to a prior layer which thereby adds a recursive element to the overall computation. Both the increase in layers, and the additional complexity associated with recursive relationships between the layers, increase the computational resources needed to implement a modern ANN.

FIG. 1 illustrates a directed graph 100 for the computation of a modern machine intelligence system. The input to directed graph 100 is an input tensor X. The output of directed graph 100 is an output tensor Y. The input could be an encoding for a picture, such as an image of a cat 101. In this example, execution of directed graph 100 involves the graph providing an encoding of a textual guess as to what the content of the encoded image contained. The graph output can be referred to as an inference generated by the directed graph because the machine intelligence system is effectively inferring what the picture shows from the encoding of the picture. As such, if directed graph 100 represented a properly trained machine intelligence system, execution of graph 100 with input tensor X would produce an output tensor Y which encoded the word "CAT" as illustrated.

The edges of directed graph 100 represent calculations that must be conducted to execute the graph. In this example, the graph is broken into two sections—a convolutional section 102 and a fully connected section 103. The convolutional portion can be referred to as a convolutional neural network (CNN). The vertices in the directed graph of CNN 102 form a set of layers which includes layers 106, 107, and 108. The layers each include sets of tensors such as tensors 109, 110, and 111. The vertices in the directed graph of fully connected section 103 also form a set of layers which includes layers 112 and 113. Each edge in directed graph 100 represents a calculation involving the origin vertex of the edge. In CNN 102, the calculations are convolutions between the origin vertex and a filter. Each edge in CNN 102 is associated with a different filter $F_{11}$, $F_{n1}$, $F_{12}$, $F_{n2}$, etc. As illustrated, filter $F_{12}$ and tensor 109 are subjected to a full convolution to generate one element of tensor 111. Filter $F_{12}$ is "slid around" tensor 109 until a convolution operation has been conducted between the filter and the origin vertex. In other approaches, filter $F_{12}$ and a portion of tensor 109 are multiplied to generate one element of tensor 111 and the full convolution is used to generate multiple elements of tensor 111. In fully connected section 103, the calculations are multiplications between a set of weights and the values from the prior layer. In fully connected section 103, each edge is associated with a unique weight value that will be used in the calculation. For example, edge 114 represents a multiplication between weight $w_n$ and input value 115. The value of element 116 is the sum of a set of identical operations involving all the elements of layer 112 and a set of weight values that uniquely correspond to the origin vertex of each edge that leads to element 116.

Execution of directed graph 100 involves many calculations. In the illustration, dots are used in the vertical directions to indicate the large degree of repetition involved in the directed graph. Furthermore, directed graph 100 represents a relatively simple ANN, as modern ANNs can include far more layers with far more complex interrelationships between the layers. Although not illustrated by directed graph 100, the outputs of one layer can loop back to be the inputs of a prior layer to form what is often referred to as a recursive neural network (RNN). The high degree of flexibility afforded to a machine intelligence system by having numerous elements, along with an increase in the number of layers and complexity of their interrelationships, makes it unlikely that machine intelligence systems will decrease in complexity in the future. Therefore, the computational complexity of machine intelligence systems is likely to increase in the future rather than diminish.

SUMMARY

A processing core for the efficient execution of a directed graph is disclosed. The processing core includes a memory and a first and a second data tile stored in the memory. The first and second data tiles include a first and a second set of data elements stored contiguously in the memory. The processing core also includes metadata relationally stored with the first data tile in the memory. The processing core also includes an execution engine, a control unit, and an instruction. Execution of the instruction uses the execution engine, a first data element in the first set of data elements, and a second data element in the second set of data elements. The control unit conditions execution of the instruction using the metadata. A standard execution of the instruction generates a standard output. A conditional execution of the instruction operation generates a conditionally executed output.

A processing core is disclosed. The processing core includes a memory. The processing core also includes a first data tile stored in the memory. The first data tile includes a first set of data elements stored contiguously in the memory. The processing core also includes metadata relationally stored with the first data tile in the memory. The processing core also includes a second data tile stored in the memory. The second data tile includes a second set of data elements stored contiguously in the memory. The processing core also includes an execution engine. The processing core also includes an instruction. Execution of the instruction uses: (i) the execution engine; (ii) a first data element in the first set of data elements; and (iii) a second data element in the second set of data elements. The processing core also includes a control unit that conditions execution of the instruction using the metadata. A standard execution of the instruction generates a standard output. A conditional execution of the instruction generates a conditionally executed output. The standard output is not equal to the conditionally executed output.

A computer-implemented method for a conditional execution of a directed graph is disclosed. The method includes storing a first data tile in a memory. The first data tile includes: (i) a tile header; and (ii) a first set of data elements stored contiguously in the memory. The method also includes storing a second data tile in the memory. The second data tile includes a second set of data elements stored contiguously in the memory. The method also includes fetching an instruction. Execution of the instruction requires an arithmetic logic operation using: (i) an arithmetic logic unit; (ii) a first data element in the first set of data elements; and (iii) a second data element in the second set of data elements. The method also includes conditionally executing the arithmetic logic operation using the tile header. A conditionally executed output of the arithmetic logic unit resulting from the conditional execution of the arithmetic logic operation is not equal to a standard output of the arithmetic logic unit resulting from a standard execution of the arithmetic logic operation.

DETAILED DESCRIPTION

Figure 1:
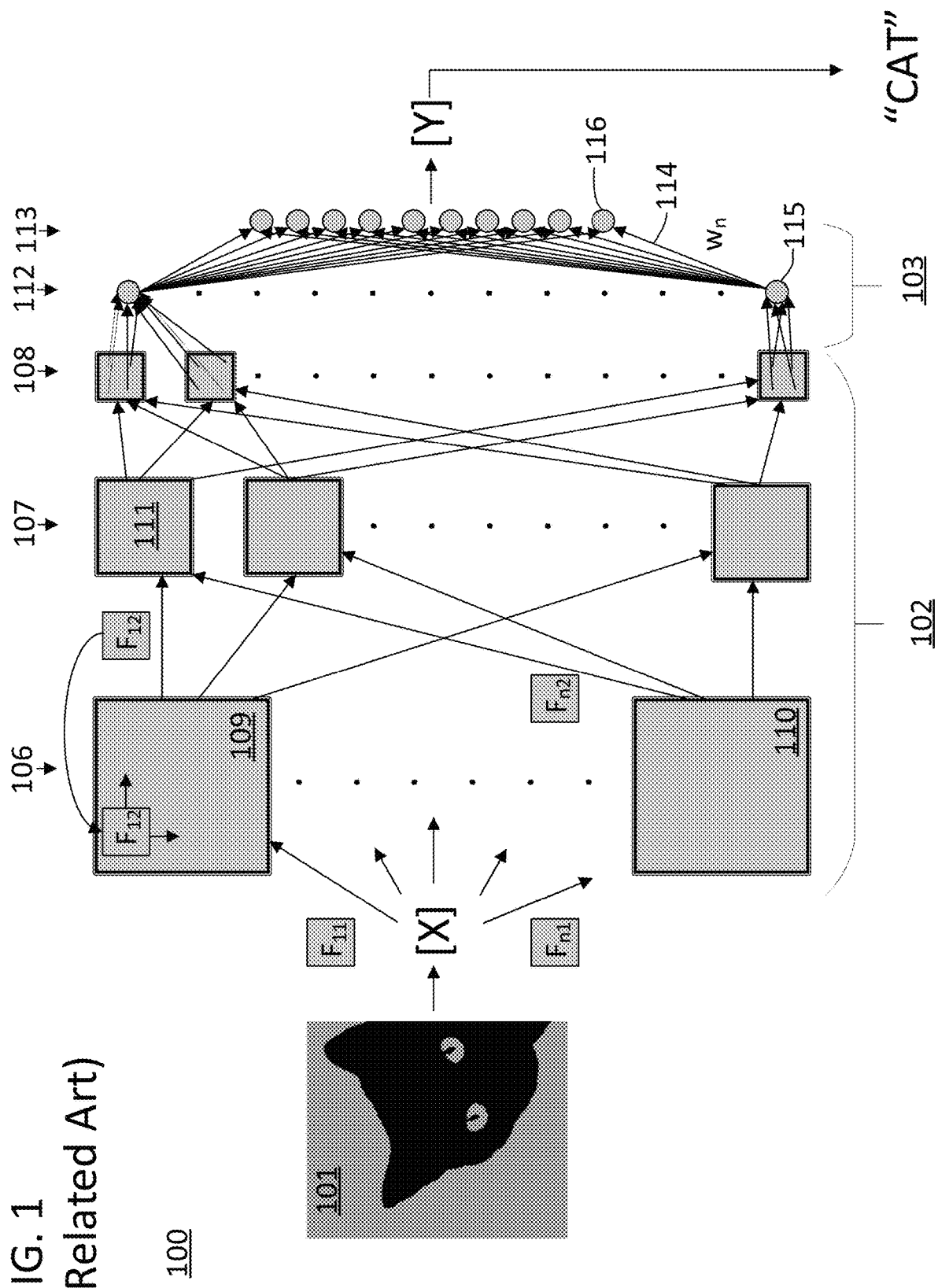
FIG. 1 includes a directed graph of an artificial neural network in accordance with the related art.

Approaches disclosed herein allow for the conditional execution of a directed graph by a processing core in a computationally efficient manner that produces essentially the same result as a standard execution of the directed graph. The approaches include a processing core and associated computer-implemented methods. The conditional execution can be actuated by a set of data that is separate from the data which constitutes the directed graph itself and the inputs and outputs thereof. The separate set of data can be metadata. The computational resources saved by performing the conditional execution of the directed graph instead of the standard execution of the directed graph are greater than the computational resources consumed in the generation, maintenance, and utilization of the metadata. At the same time, the result of the execution of the conditional execution of the directed graph is effectively equivalent to the result of the standard execution. A processing core can conduct a standard execution of the directed graph without any of the separate data. However, the conditional execution of the directed graph, as actuated by the separate data, can be more efficient than the standard execution.

In certain approaches, the data that constitutes the directed graph can be stored in tiles. The tiles can be considered storage containers for tensors that are used in instructions that execute a directed graph. The tiles, or at least specific data elements from those tiles, are retrieved from memory to execute the directed graph. For example, the instruction could be for the convolution of a tensor associated with an edge of the directed graph, stored in a first tile, and a tensor associated with a destination vertex of that edge, stored in a second tile. A kernel of the processing core could retrieve the data tiles from memory and apply them to an execution engine in response to receiving such an instruction. The size of the tiles could be dynamically modifiable to allow a single processing core to implement variant directed graphs in an efficient manner.

In approaches in which tiles are used to store the data that constitutes the directed graph, the separate data used to actuate the conditional execution of the directed graph can be stored relationally with the tiles. The separate data used to condition the execution of the directed graph can be stored in the tiles or in a separate data structure. For example, the separate data could be metadata stored in a header of the tiles, and the data that constitutes the directed graph itself could be stored in a body of the tiles. The data in the body of the tile can be referred to as the payload of the tile. As another example, the separate data used to actuate the conditional execution could be stored as a key pair with an identity of one of the tiles in a separate data structure. The separate data can be stored relationally in the same memory or on a different memory.

The conditional execution of the directed graph can include the conditional execution of an instruction. The conditional execution of the instruction can likewise include the conditional execution of arithmetic logic operations. In certain approaches, the conditional execution of the graph is defined by one or more conditional arithmetic logic operations that are substituted in place of one or more standard arithmetic logic operations. The execution of a directed graph generally involves numerous instructions conducted to implement the edges of the directed graph. The instructions could be executed by an execution engine on the processing core. The execution engine could include multipliers, registers, adders, accumulators, ALUs, floating point units, and any other hardware required to execute an instruction in response to a command and produce a set of outputs in response to a set of inputs.

The instructions could be simplified in the conditional execution relative to the corresponding instruction in the standard execution of the graph. For example, the multiplication of two data elements could be conditioned and simplified by reducing the precision of the multiplication or by replacing one of the data elements with a similar value in a more basic format. As another example, operations used to implement an instruction could be inhibited in a conditional execution. Furthermore, the output of such operations could be replaced by pulling a fixed value from memory to serve as a substitute output to the output that would have resulted from a standard execution of the operation. This second class of approaches provides benefits not only in reducing the computational complexity of the operations that need to be conducted, but also by reducing the amount of data that needs to be moved through the system. If an operation is inhibited entirely, there is no need to move the input data from memory to the computational element that will execute the operation. The result of inhibiting operations entirely is a decrease in both computational complexity and memory bandwidth requirements. In accordance with this disclosure, the "conditional execution" of an instruction or operation includes inhibiting the instruction or operation entirely and providing a fixed output in place of the output that would have resulted from the standard execution.

The data used to actuate the conditional execution can be generated at numerous times relative to the data produced by the execution of the graph itself. In certain approaches, the data used to actuate the conditional execution is generated at runtime while the directed graph is being executed. The data can be generated as a by-product of the execution, or can be generated through an additional routine that executes while the directed graph is being executed. In other approaches, the data used to actuate the conditional execution is generated during a first simplified graph execution. Regardless, the cost of generating this additional data is less than the benefit derived from its use. The manner in which the data is generated can be controlled by hardware or software. However, benefits accrue to approaches in which the runtime hardware alone is used to generate the data. Generating the data in software could add instruction cycles to the processing core and it would thereby be difficult to realize the level of performance improvement required to justify the additional expense associated with generating the data in the first place.

The data used to actuate the conditional execution of the graph can also be utilized at numerous times relative to the time it was generated. The data can be generated during the execution of one layer of the directed graph and then can be used to condition the execution of a later layer of the directed graph. The data could also be generated during one execution of the directed graph, and could then be used during a subsequent execution of the directed graph with a different input. Consider a first execution of a directed graph with input Y that requires an instruction using tile X as an input. That first execution could generate metadata for tile X. Subsequently, tile X could be used as an input for an instruction during a second execution of the directed graph with input Z. The execution of that instruction could be conditioned using the metadata generated during the first execution of the directed graph. Furthermore, the data can be generated during a first simplified execution of the directed graph, or a specific instruction necessary for the first simplified execution, and can be used to determine if a regular execution should have been conducted. For example, a specific instruction could be executed using lower precision than a standard execution, and the lower precision execution could generate metadata for a tile involved with the execution. The metadata could then be evaluated to determine if the same instruction should be replayed at a higher precision.

The example of a directed graph implementing an ANN provides an illustrative example throughout this disclosure of an application where conditional execution can lead to improved and more efficient performance. In such a case, the data elements of the tiles can include weight values, activation values, input values, filter values, or accumulation values of the ANN. The execution of the directed graph would thereby include numerous instructions and logical arithmetic operations on those values. For example, the instructions could involve multiplications between weight values and the outputs of a prior layer, or convolutions between filter values and values from a prior layer. The execution of the directed graph would thereby include instructions to conduct a matrix multiplication or convolution on two tensors to produce an output tensor.

ANNs benefit from conditional execution in accordance with certain disclosures herein because they are generally over-parameterized for any given inference. This is because ANNs are generally trained to work with many different potential inputs but only process one input at a time. For example, an ANN may be able to recognize multiple subjects in an input image, but only a small portion of the associated graph may respond in a meaningful way to any one subject. Different portions of the graph may acutely contribute to the output when the subject is a dog, and not contribute at all when the subject is a cat. As a result, a perfectly accurate execution of the lower priority portions of the directed graph would lead to wasted computations that do not contribute in a meaningful way to the generation of an accurate inference. By conditioning execution of the directed graph, only the portions of the data from the directed graph that are of importance for a particular inference are involved in high precision executions. The specific approach of placing the separate data used to actuate the conditional execution in the same data structure as the data used for the standard execution assures that the data is available when it is needed. Furthermore, it assures that such separate data can be efficiently updated when the results of a given execution involving its associated data is completed and its effect is measured.

Figure 2:
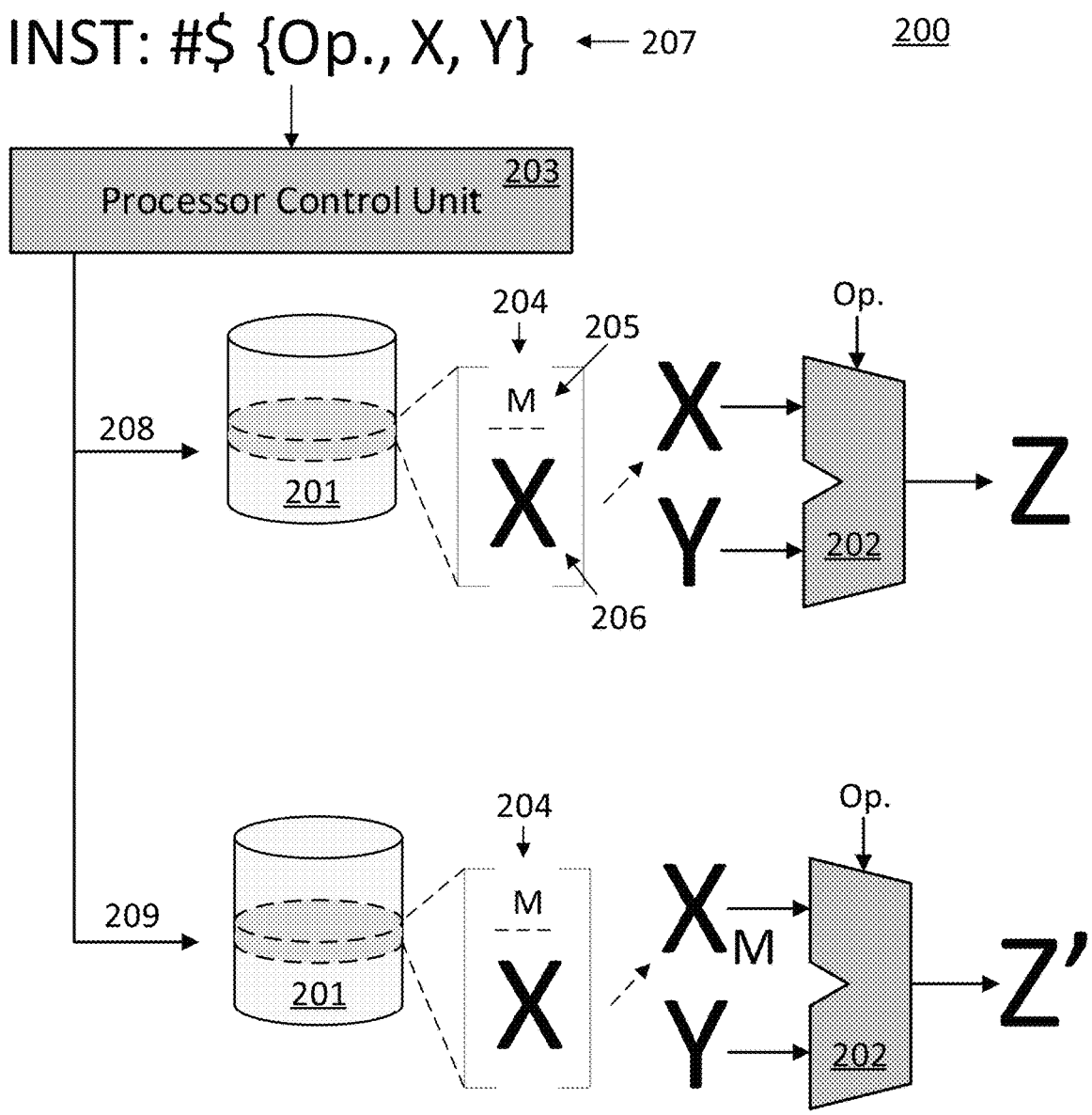
FIG. 2 provides a data flow diagram for a metadata actuated conditional execution of an arithmetic logic operation.
Figure 3:
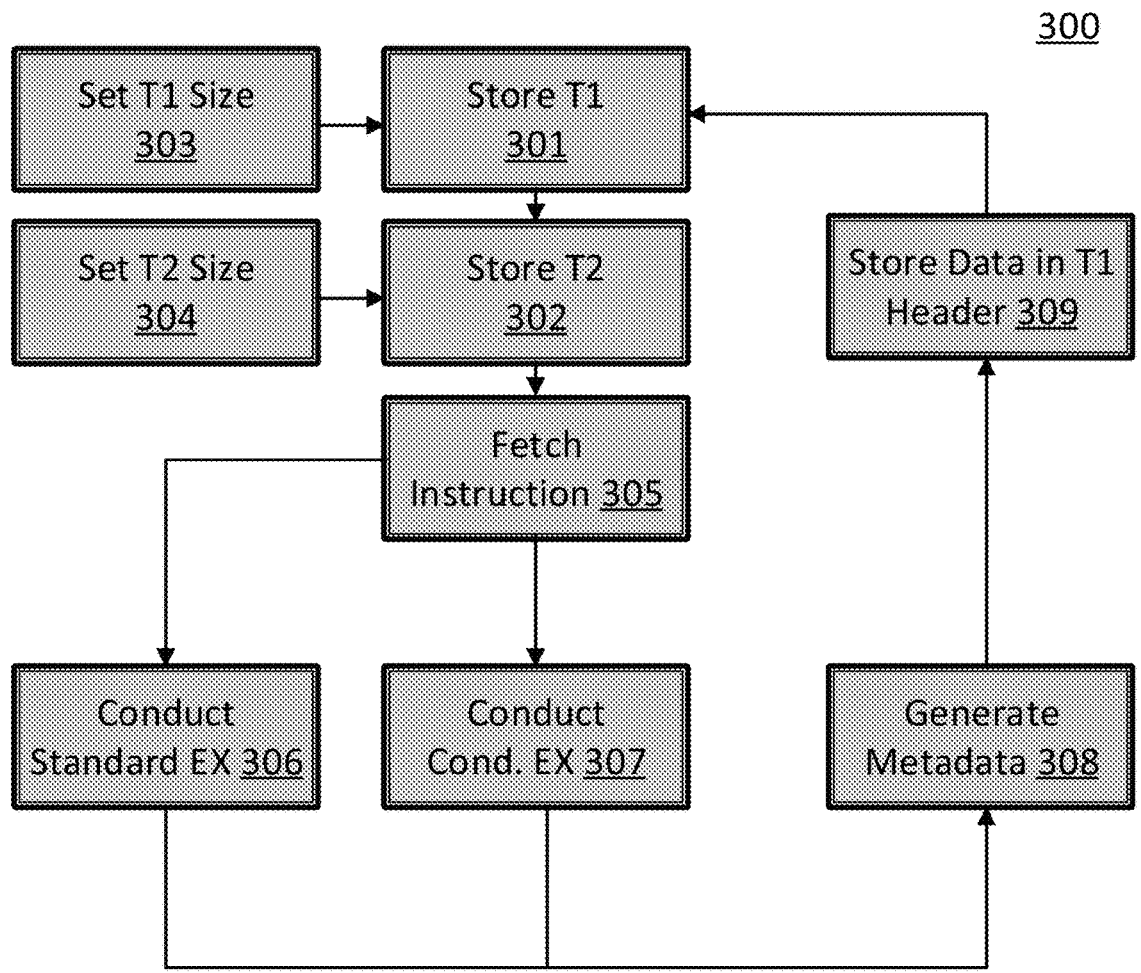
FIG. 3 provides a process flow chart for a metadata actuated conditional execution of an arithmetic logic operation and a data flow diagram of how that metadata can be generated.
Figure 3:
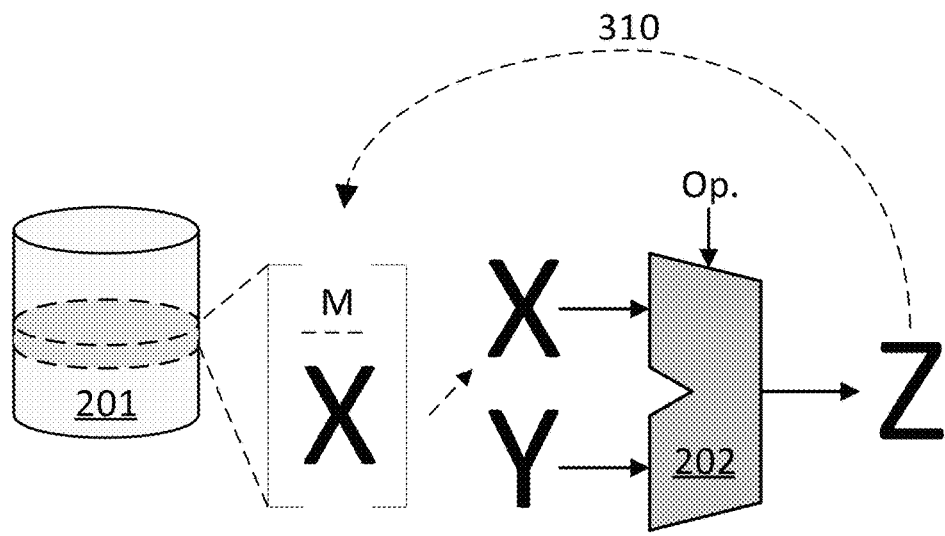

FIG. 2 and FIG. 3 include a data flow diagram 200 and process flow chart 300 that provide an example conditional execution of a directed graph by a processing core in accordance with some of the approaches disclosed herein. Data flow diagram 200 provides an illustration of two potential data flows that can be executed by a single processing core. The processing core includes a memory 201, an arithmetic logic unit (ALU) 202, and a control unit 203. The term "arithmetic logic unit," as used herein, is not limited to hardware that is only equipped to conduct integer arithmetic; and is meant to include hardware that can conduct floating point arithmetic. Like elements are referred to using the same reference numbers. For the avoidance of doubt, data flow diagram 200 illustrates the data flow for two different arithmetic logic operations conducted at separate times, and the two instances of memory 201 and arithmetic logic unit 202 are not separate physical instances on a processing core. Memory 201 stores data tiles that are used to execute a directed graph. As such, method 300 includes a step 301 of storing a first data tile in a memory and step 302 of storing a second data tile in memory. The data tiles are used during the execution of the directed graph.

Data tiles used in combination with the approaches disclosed herein can be contiguous blocks of memory in a memory on a processing core. The data tiles can alternatively, or in combination, be portions of a memory that are addressable by a single physical or virtual address. The data tiles can store a set of data elements. The data elements can be integer variables. The data elements can be fixed point or floating point variables. The data elements can be binary true/false or plus/minus variables. The data tiles in a memory can vary in size from tile to tile at any given time. The size of a specific tile can also fluctuate temporally in response to commands received from a controller. The header of the data tile can include metadata used to condition execution of the directed graph. The body of the data tile can include data elements that form the content of a directed graph. The body and header of the data tiles can be stored contiguously in memory such that the content of the directed graph and metadata are accessible from a single memory address. However, the metadata can also be stored relationally to the tiles in a separate data structure that is independently accessible. The size of the data tiles can be set by a software controller or entirely by hardware on the processing core. As such, method 300 includes steps 303 and 304 which involve setting the size of the first and second data tiles.

FIG. 2 illustrates a data tile with a tile header 205 in addition to a payload 206. The body can include a set of data elements. In approaches in which the tiles are used for the execution of a directed graph, the set of data elements can be directed graph data elements. As used herein, directed graph data elements are data elements that are required for the complete execution of a directed graph. The directed graph data elements can be tensors such that the tiles are effectively tensor storage containers. The data in tile header 205 can be separate data that is separate from the directed graph data elements in that it is not required for the complete execution of the directed graph. The data in the tile header can be metadata. The separate data in the header can be used by the processing core to indicate that an operation utilizing data from the body of its tile should be conditionally executed. The separate data in the header can, in the alternative or in combination, be used by the processing core to conditionally execute an operation in lieu of the data in the body of the tile. In keeping with the tradeoff associated with maintaining the separate data and realizing an improvement in performance attributable to use of the separate data, benefits accrue to approaches in which header 205 is smaller than payload 206 by a factor of 4 or greater. In specific approaches, header 205 is smaller than payload 206 by a factor of 7. For example, the tile could have a total size of 1024 bytes, and the header could be 128 bytes or less. In approaches in which the tiles and metadata are stored in separate data structures a similar scaling factor between the overall data structures produces similar benefits.

In the example of a directed graph implementing an ANN, the directed graph data elements can be weight values, activation values, input values, filter values, or accumulation values, of the ANN. In the case of an ANN, it can be beneficial to adjust the size of a data tile dynamically as the same processing core is used to implement different ANNs with differently sized layers, filters, etc. In some approaches, the size of the data tiles can be set by a software controller and can be adjusted by a programmer on a global, set, or individual tile basis. In the case of an ANN, the size of each title may be larger than a single ANN data element, such as a single neuron's weight value, but will generally be smaller than a complete layer of the ANN. As such, the manipulation of the tile data requires fewer address look ups than an execution in which elements are addressed individually, but also provides improvements in computational efficiency owing to the ability to break a layer into pieces that are manipulated independently. For example, a tile could serve as storage container for a sub-tensor of a tensor that defined an entire layer or filter in the ANN.

The data tiles can be used to execute a directed graph in accordance with an instruction stored in a computer-readable non-transitory medium on the processing core. The instruction can be part of an instruction sequence fora standard execution of the directed graph. For example, the instruction could be a complex hardware sequence with tensors as inputs and outputs. The instruction could be for a convolution or matrix multiply of those inputs and produce a tensor as an output. To use the example of an ANN, the inputs could be a set of weight values for a layer of the ANN and a set of input values to that layer, the operation could be a matrix multiplication of those values, and the output could be a tensor that formed part of an input to the next layer in the ANN. The same instruction can, at different times, result in either the standard execution of a given operation ora conditional execution of that operation. In accordance with certain approaches disclosed herein, the conditional execution can be more efficient than the standard execution.

In FIG. 2, the instruction 207 is represented in mock assembly code and includes a single operation "Op.", and the identity of at least two data elements "X" and "Y." As such, the instruction results in the execution of an arithmetic logic operation. For example, the instruction could cause the identity of the arithmetic logic operation "Op" to be delivered to the control input of an arithmetic logic unit and two data elements to be delivered to the operand inputs of the arithmetic logic unit. In the illustrated case, the inputs to ALU 202 come from the set of data elements X and Y. Set of data elements Y can include any data element. However, in certain cases, set of data elements Y will be obtained from the body of a second tile stored in memory. The non-transitory medium on which instruction 207 is stored could be the same memory as the memory on which the first and second tiles are stored. However, the tiles and instructions could also be stored on different cache levels on the processing core.

FIG. 3 includes a step of fetching an instruction from memory 305. The instruction can be instructions 207 from FIG. 2. The instruction can then be acted upon by a processor control unit such as processor control unit 203 in FIG. 2. FIG. 3 illustrates how two separate data flow paths can extend from the execution of step 305 (e.g., either a standard execution step 306 or a conditional execution step 307). During a standard execution, processor control unit 203 will direct data flow through data flow path 208. As illustrated, a standard execution of the arithmetic logic operation indicated by instruction 207 involves at least one data element from a first set of data elements X provided in combination with at least one data element from a second set of data elements Y to ALU 202 to generate output Z. During a conditional execution, control unit 203 could alternatively have directed data flow through data flow path 209. As illustrated, the conditional execution produces a different output Z'. This is because the data element delivered to ALU 202 is $X_M$ which is a version of the data element from the first set of data elements X that has been altered based on metadata M. The various way in which the metadata can actuate a conditional execution are discussed in more detail below. In particular, and as described in more detail in FIG. 4, the conditional execution could involve foregoing an operation or set of operations all together.

The separate data used to condition execution of a directed graph can be generated during executions of the directed graph. In some approaches, separate data used to condition a later execution of a specific operation can be generated during a prior execution of that same specific operation in a prior execution of the entire directed graph. For example, the execution of an operation using tile X during a first execution of directed graph at time "t" could generate metadata that is used to condition the execution of an operation using tile X during a second execution of the same directed graph at time "t+1." In some approaches, separate data used to condition a later execution of a specific operation can be generated during the execution of an upstream operation in the same execution of the directed graph. For example, metadata generated for an output tile for a layer 2 operation could be used to condition the execution of a layer 3 operation where the layer 3 operation used that output tile as an input. The prior execution can be a standard execution, a conditional execution, or an execution of a simplified version of the directed graph. The simplified version of the directed graph can be derived and executed using any of the approaches disclosed in U.S. Pat. App. No. 62/483,133 filed on Apr. 7, 2017, which is incorporated by reference in its entirety herein for all purposes. The separate data can, in some cases, be generated as a side effect of these prior executions, and can be used to populate the tiles to essentially "decorate" tile sized chunks of the directed graph with additional information. The additional information can take on many forms and can be used to cause and/or effect conditional execution as described in more detail below. A specific example of this process is provided in the remainder of FIG. 3.

The data generated during prior executions can be stored as the metadata of the tiles involved in those prior executions. The metadata can provide an indication as to the relative importance of an operation involving the tiles to the overall execution of the directed graph. For example, the metadata could be a flag indicating that a specific tile was of "high" or "low" priority. As another example, the metadata could be a numerical value that indicated the relative priority of a given portion of the directed graph as a "10" to indicate a high priority relative to a different portion with a numerical value of "6.32" to indicate a moderate priority. The priority values could then be used to condition the accuracy of any operation conducted using those specific tiles. In other approaches, the metadata could be an approximation of the data in the tiles or an approximation of the outcome of an operation or set of operations involving the tiles. For example, the metadata could include an average of the outputs of all operations involving the data in the past so that the average could be provided in the future as a substitute for conducting an operation using the actual data in the tile. In certain approaches, prior executions allow the processing core to generate information concerning which portions of a directed graph are strongly active at runtime and to prune out computations related to portions of the directed graph that are not strongly active or that do not strongly contribute to the outcome of the directed graph. For example, tiles with metadata indicating the tile is of "low" priority could be pruned out while tiles of "high" priority could be subjected to a standard execution.

Flow chart 300 includes a step 308 of generating metadata. This metadata can be derived from the output of the arithmetic logic operation as shown by data flow line 310. The data can be generated as a by-product of the execution in steps 306 and 307, or can be generated through an additional routine that executes while the directed graph is being executed. The metadata can be generated solely using a set of hardware elements of the processing core. Alternatively, the metadata can be generated using a software controller. As the metadata is generated as a by-product of prior executions regarding a portion of the directed graph it is well suited to provide an indication as to the importance of that portion of the directed graph to the overall execution of the directed graph. The metadata generated in step 308 can be stored in the header of the tile as in step 309. Alternatively, the metadata can be stored in a separate data structure. The tile can then be reused later with the metadata providing additional information used to actuate a conditional execution.

As illustrated, the metadata for a tile is generated by the standard execution of an operation involving the data in the body of the tile. However, the metadata can also be initially generated or updated during a conditional execution involving the tile, or during an operation involving a wholly separate tile. The metadata can also be continuously updated every time an associated tile is used, periodically updated with less frequency, or can be set once when a specific directed graph is instantiated and then fixed until a different graph is instantiated by the processing core or an associated tile is deleted. In certain approaches, the metadata could also be set by a programmer using a software controller across the entire core on a global, set, or individual tile basis.

The separate data from the directed graph data can take on variant forms depending upon how the conditional execution will proceed. The separate data can actuate conditional execution by either indicating that a conditional execution should be executed, indicating a particular class of conditional execution that should be executed, or actually containing substitute directed graph data that should be used during the conditional execution. For example, the metadata can include a power value for the tile payload, a mean and variance for the values in the tile payload, a power value combined with a white noise distribution, an approximate spectrum of the tile, a heavily down-sampled version of the tile, or a histogram of values in the tile. In a particular example, the metadata could be a histogram of floating point exponent values for the data elements in the payload. As another example, the metadata could be a simple flag indicating a type of conditional execution that should be conducted with the tile, or a flag indicating how important the tile is to the overall execution of the directed graph (e.g., "low," "medium," or "high"). A separate system could then condition the execution based on that priority level.

Figure 4:
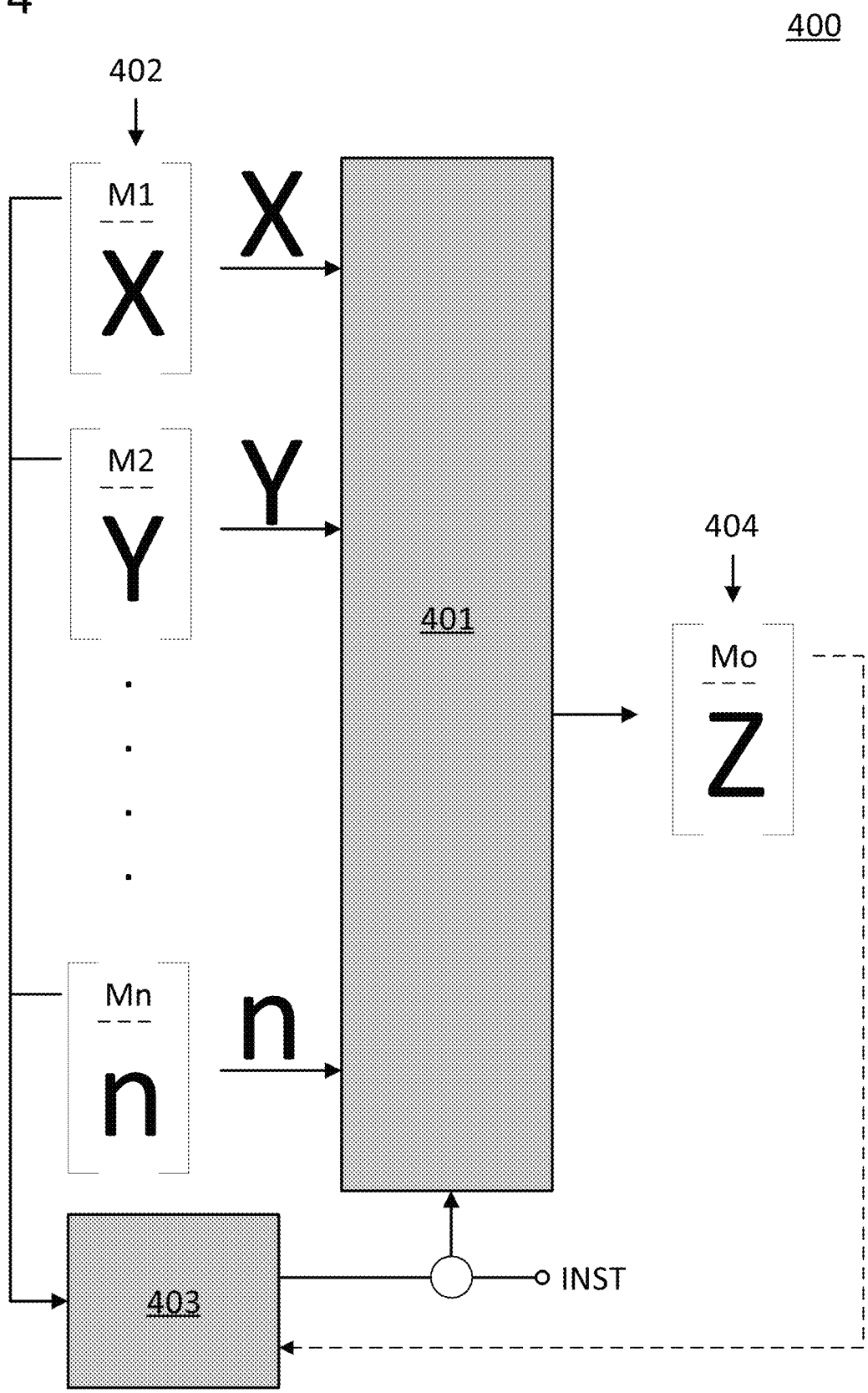
FIG. 4 provides a data flow diagram for a metadata actuated conditional execution of an instruction used to execute a directed graph.
Figure 5:
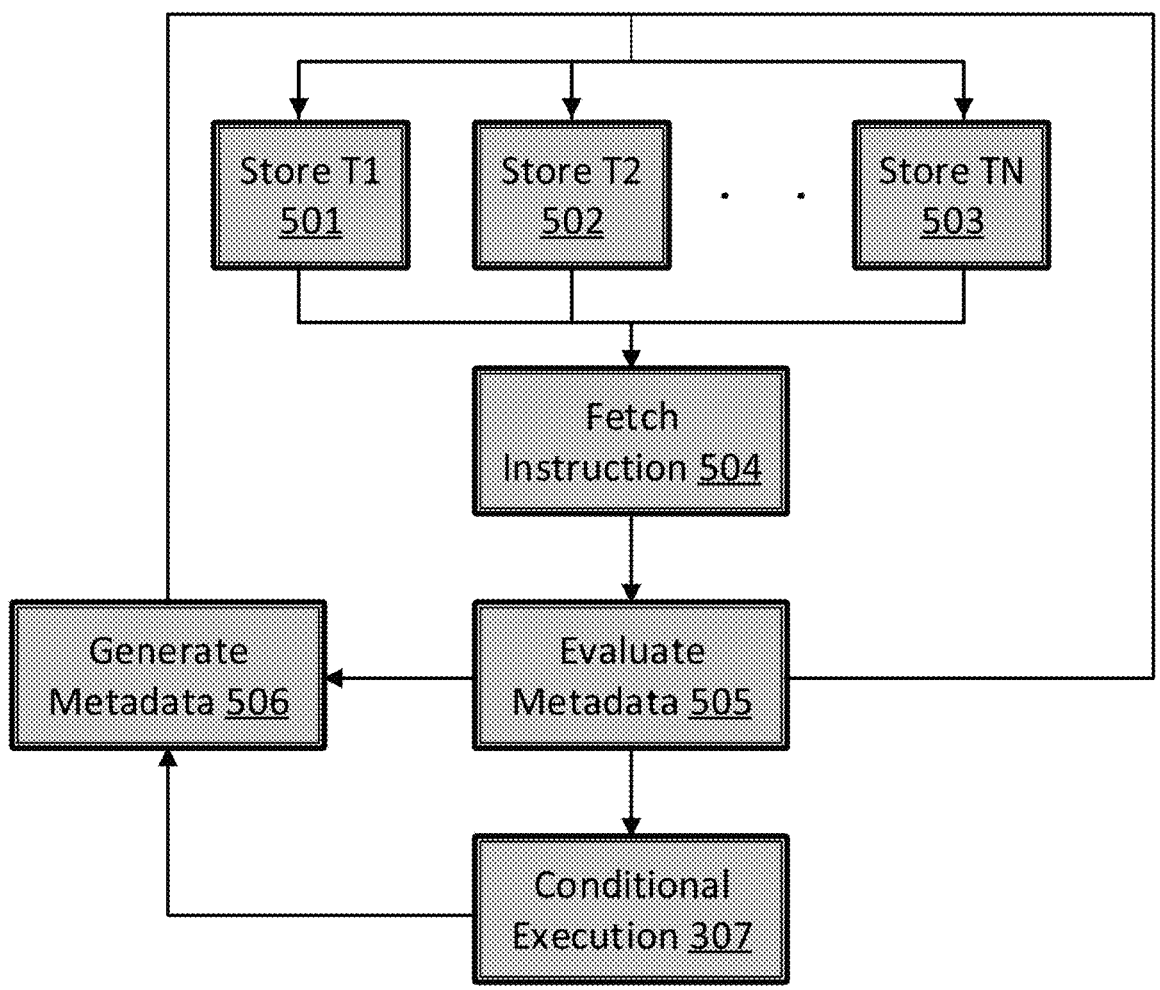
FIG. 5 provides a process flow chart for a metadata actuated conditional execution of an instruction used to execute a directed graph.

In light of the principles outlined by the above disclosure and FIGS. 2-3, more complex implementations can be described with reference to FIGS. 4-5. FIG. 4 includes dataflow diagram 400 for a metadata actuated conditional execution of an instruction used to execute a directed graph. Execution engine 401 includes n operand inputs and, in the illustrated example, receives the entire payloads of tiles 402 in the form of multiple tensors X, Y . . . n. Execution engine 401 represents a complex collection of hardware that is utilized by the processing core to execute instruction INST in accordance with certain approaches disclosed herein. For example, the execution engine can include multipliers, registers, adders, accumulators, and other logic, and can use that circuitry to generate output data from input data in response to received control inputs. The control inputs can be derived from the low level kernel instructions of the processing core as provided by control logic 403. Control logic 403 is able to condition execution of instruction INST based on a review of the metadata in all, or a sub-selection of, tiles 402. Furthermore, control logic 403 can condition execution of instruction INST based on a review of the metadata in output tile 404 that was stored prior to the execution of instruction INST, such as from a prior execution of instruction INST. The functions executed by logic 403 can be executed entirely in hardware on the processing core. However, the functions can be programmed by a software controller. Furthermore, the functions of logic 403 could both be programmed and executed by a software controller.

Flow chart 500 begins with steps 501, 502, and 503 where multiple tiles are stored in memory. In flow chart 500, a set of tiles greater than 3 are involved in the execution of a single instruction. The flow chart continues with step 504 in which an instruction is fetched for execution. The instruction could include any number of basic or complex operations to be conducted on the set of tiles. In step 505, the metadata of any or all of the tiles is evaluated to determine how the instruction should be executed. In certain cases, the instruction will be conditioned by foregoing the instruction entirely which returns the process to the step of storing the tiles. However, the flow chart can also proceed to step 506 in which additional metadata is generated. Step 506 can be executed regardless of whether the instruction is executed or not. If the instruction is to be executed based on the evaluation in step 505, the flow chart continues with a step 307 of conditionally executing the instruction. During the conditional execution, metadata can be generated and stored via step 506.

The analysis of metadata used to condition the execution of an instruction, and the manner in which that instruction is conditionally executed, can be complex in nature. The analysis can involve an evaluation of the metadata of multiple tiles and the conditional execution can involve different tiers of conditioning. With reference to FIG. 4, the evaluation in step 505, as conducted by logic 403, could involve metadata M1, M2, and Mn. Furthermore, the conditional execution in step 307 could involve replacing all the values of n with fixed values, replacing all the values of Y with lower precision data elements, or any combination of the conditional execution techniques disclosed elsewhere herein. The following pseudo code gives a further example of how the execution could be conditioned. Programmatic conditional execution in accordance with this example could be executed in accordance with source code written by a programmer to allow a software controller to execute the conditional computation, or it could be implemented directly in hardware. The pseudo code could be implemented in a state machine or micro code below software level.

Z=function_compute_Z(X, M1, Y, M2, . . . n, Mn) {
  plan=decide_plan_based_on_metadata (M1, M2, . . . Mn);
  if (plan==Output_Zeros) Z=0
  else if (plan==Output_Metadata) Z=M1
  else if (plan==Lower_Precision_Compute Z)=convolve_8b (X, Y, . . . n)
  else Z=convolve_16b (X, Y, . . . n);}

The pseudo code above shows how execution engine 401 and logic 403 can be used to implement a nuanced conditional execution of instruction INST. In the pseudo code, INST is a 16-bit convolution of all the tensors input to execution engine 401. The pseudo code first determines a plan based on the metadata. Based on the plan, the pseudo code will either output a zero set for Z, replace Z with data from metadata M1, conduct an 8-bit convolution of the inputs, or conduct the standard execution. Any variation on this programmatic specification of the conditional execution of instruction INST is possible. The relationship between the metadata, the output data, and the instruction can follow complex functions. As stated previously, the plan can also be generated using metadata from the output tile Z, or any other tile in the system.

As stated previously, the metadata used by logic 403 does not need to be stored continuously with tiles 402 and it can be generated in numerous ways. For example, metadata M1 . . . Mn, and Mo can be generated from a previous standard or conditional, execution of INST. Alternatively, metadata M1 . . . Mn can be generated from a prior execution that generated the current values of tensors X, Y, and n. To return to the example of a directed graph used to implement an ANN, metadata M1 . . . Mn can be generated during the execution of a prior layer of the ANN, and metadata Mo can be generated during the execution of the current layer of the ANN. Any combination of these possibilities is possible, such as metadata Mo being generated during a prior execution of INST, and M1 . . . Mn being generated during the execution of an instruction associated with a prior layer. In accordance with this programmatic implementation of how conditional execution is actuated, any metadata stored in the processing core when INST is executed can be used to condition the way INST is executed.

Figure 6:
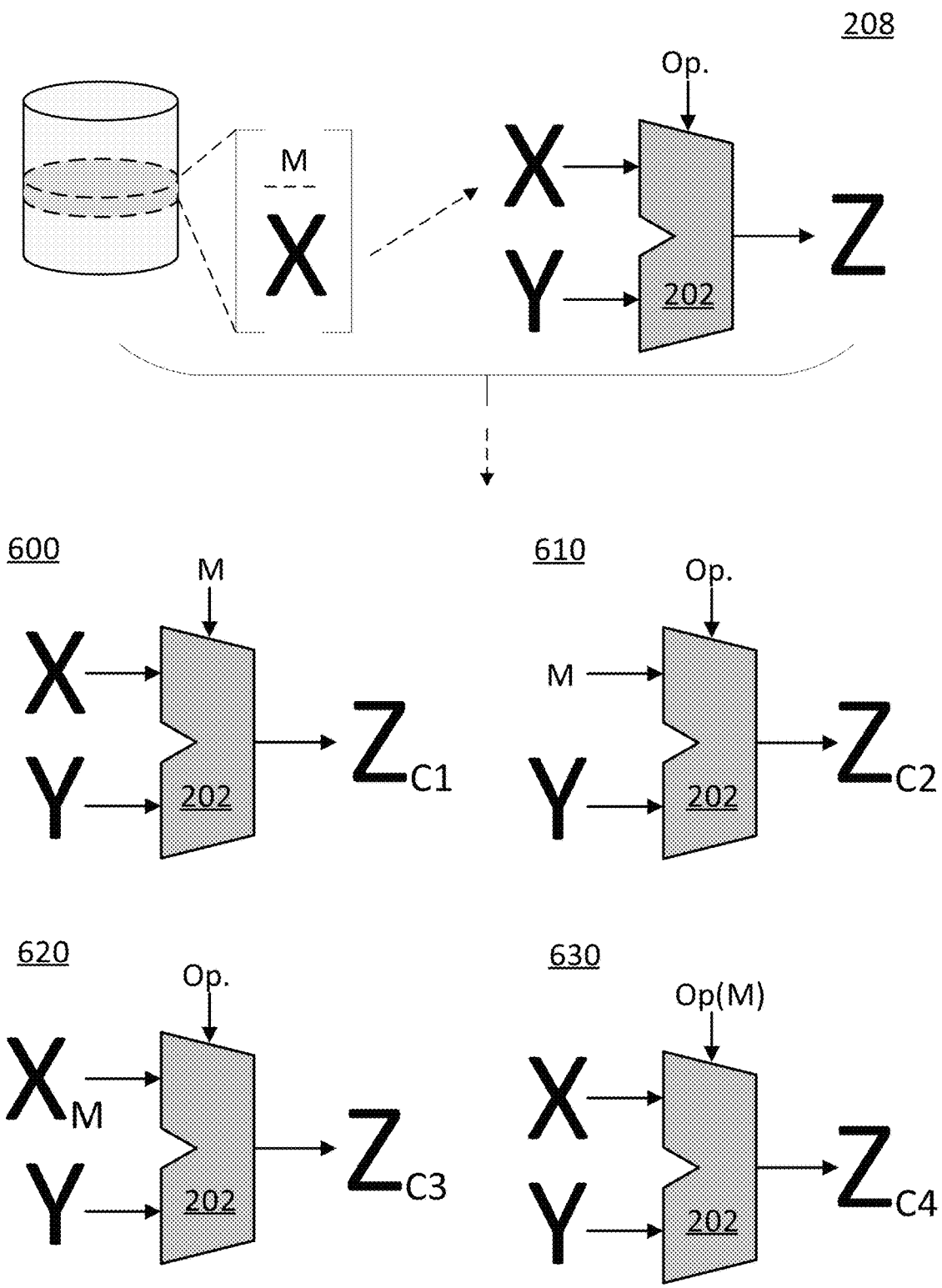
FIG. 6 provides a data flow diagram of different approaches for conditional execution using metadata.

FIG. 6 illustrates ways in which the metadata M of a tile can be used to actuate a conditional execution of standard execution 208. In the diagrams of FIG. 6, the conditional execution of specific operations is provided as an example, but the same concepts apply to the conditional execution of entire instructions. In diagram 600, the metadata is itself a stored version of an operation command "Op." for ALU 202. As the operation will be different than the operation command "Op." used in standard execution 208, this will result in a different output $Z_{C1}$ being produced by the conditional execution. The metadata itself is therefore applied to the ALU to condition the execution. In diagram 610, the metadata is itself substitute directed graph execution data that is used in place of data elements X to produce a different output $Z_{C2}$. In diagram 620, the metadata is used to alter data elements from X to $X_M$ before they are applied to the ALU. For example, $X_M$ could be a lower precision version of X such as in a situation in which X is a floating point variable and $X_M$ is a fixed point variable, or a situation in which X is a 16-bit variable and $X_M$ is a 4-bit variable. As another example, $X_M$ could only retain the sign of X. As another example, $X_M$ could be a fixed number pulled from another location in memory based on an address set by M. As $X_M$ is not equivalent to X this will result in an output $Z_{C3}$ that is not equal to Z. In diagram 630, the operation command has been modified by data stored in M as opposed to the metadata M being the operation command itself as in 600. As Op(M) is not equivalent to "Op.", this will result in an output $Z_{C4}$ that is not equal to Z. In the alternative, data stored in M could be used to assure that the operation was not executed. In the alternative or in combination, data stored in M could be used to substitute for Z without the operation being conducted.

The instructions and operations required for the execution of the directed graph can be conditioned in numerous ways. Generally, the degree to which a computation is conditioned can be set to vary across the directed graph and can include various gradations that align with the relative priority of that portion of the graph. For example, regions of relatively high priority could be computed just as they would be in the unconditionally executed directed graph, while regions of relatively low priority could be excluded from computation entirely. The various approaches for conditional computation discussed below could be mixed and assigned in various ways to the levels of priority. For example, high, medium, and low priorities could be associated with three entirely separate conditional computation schemes. As another example, the conditional computation scheme could be held constant across the directed graph, but the relative accuracy of the scheme could be modified in accordance with the priorities. For example, a degree of rounding or downsampling could be set proportional to the priority level with a smooth transition from using the original values, to using rounded values, to execution conducted independently of the original values. Such approaches could be efficiently applied if the priority value was a smoothly varying numerical value.

The actual conditional execution of the directed graph can be conducted in various ways. The conditioning and the forms of conditional computation being separated concepts. Based on the execution data, the fidelity of various computations in the execution of the directed graph can be selectively decreased to different levels. For example, the precision of computations could be decreased from 16-bit to 8-bit. As another example, the conditional computation could involve decreasing the number of bits used to represent the inputs or outputs of a given computation. As another example, the data structure used to represent the data elements of a given computation could be simplified (e.g., from 8-bit floating point to 4-bit fixed point). The data structure format of the data elements could be converted between all formats while being brought into data RAM on the processing core via direct memory access. As another example, the conditional computation could involve providing a fixed pre-computed value from memory in place of executing the computation. In one example, this value could be stored in a header of a data tile that would otherwise have been involved in the computation. As another example, the actual arithmetic portion of the computation could be simplified such that it discarded a certain number of LSBs from the computation. As another example, the computation could be suppressed altogether without even the need for providing a masked value. In even more specific approaches, replacement values for the output of the computation could be stored downstream in association with later stages of the directed graph. For example, upon review of the metadata in the input tiles to an instruction, it could be determined that the instruction does not need to be executed, and the precomputed metadata of the output tile could be used as the output of the instruction. Furthermore, individual computations could be subjected to conditioning and conditioned in a programmatic fashion as described above with reference to FIG. 4 and the associated pseudo code.

Figure 7:
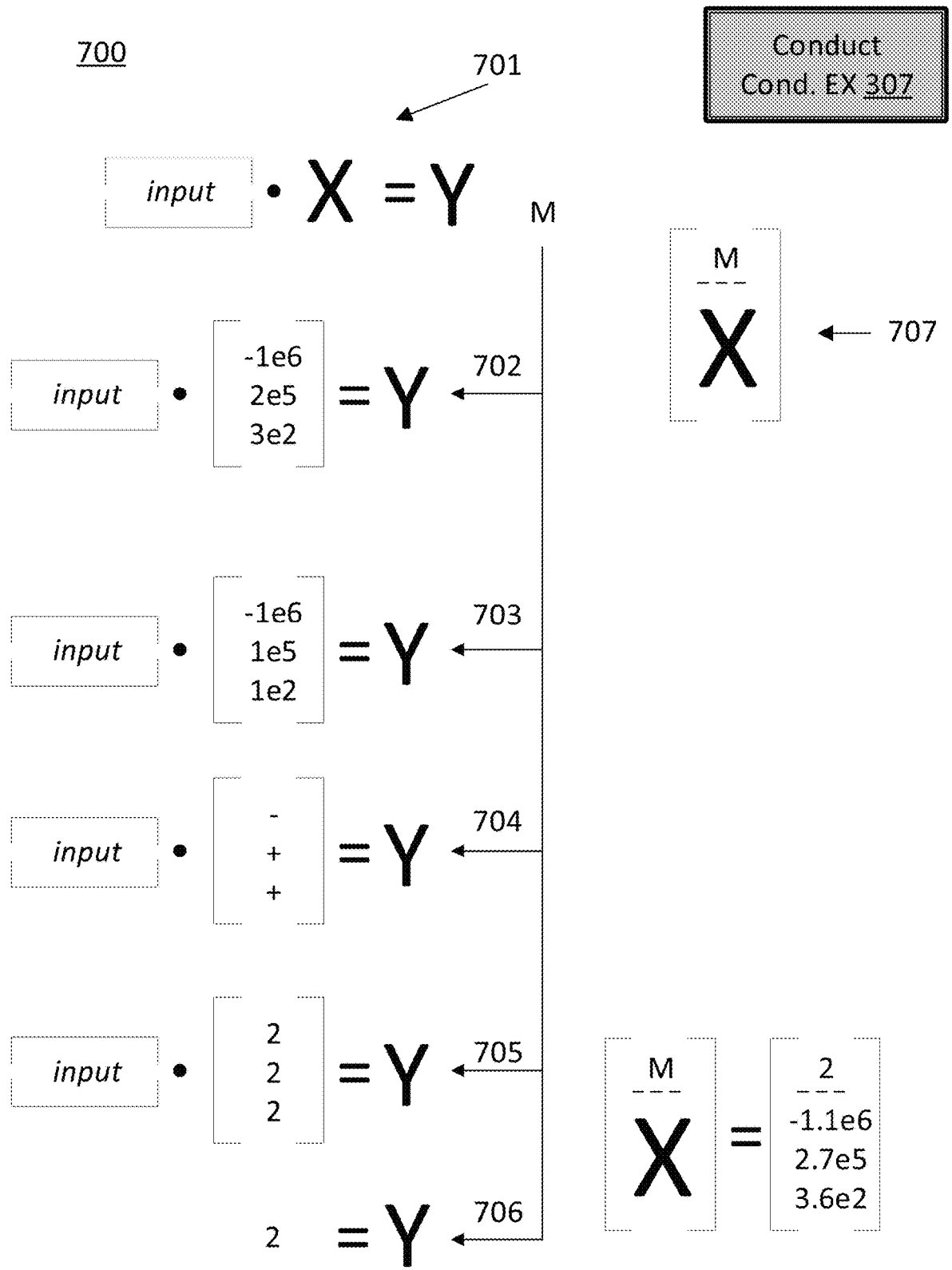
FIG. 7 includes an illustration of specific approaches for conditionally executing a directed graph.

FIG. 7 is an illustration of ways by which the conditional execution of the operations can be executed. In the diagrams of FIG. 7, the conditional execution of specific operations is provided as an example, but the same concepts apply to the conditional execution of entire instructions. Data flow diagram 700 includes a first computation 701 that needs to be computed to execute a directed graph. The branches moving down the page indicate various levels of conditional execution that could be used in place of the original operation based on the priority value of the associated tile or operation. For example, if computation 701 had a major impact on the output of the directed graph, it might be executed in full. However, if the impact was slight, the computation could be conditionally executed in accordance with one of the substitute levels shown by 702-706.

The level of precision applied to a given operation could be implied by the metadata of the data elements involved in the calculation. The metadata could include a direct indicator of a level of precision that should be applied, or data that is used by a program to determine the level of precision that should be applied. In the illustrated case, the metadata is M and it is associated with data element X in tile 707. Priority level 702 could involve a slight rounding of the data values and the potential reduction in the number of bits utilized by the data structures storing the values. Priority level 703 could involve keeping only the sign and exponent of the original values. Priority level 704 could involve only keeping the sign of the original values. Another priority level could approximate the data elements using lower precision such as by replacing the data elements with lower bit approximations. Priority level 705 could involve replacing the data elements with a predetermined value. Priority level 706 could involve skipping the operation altogether and providing a predetermined value in place of the output of the operation. As illustrated, the value for conditional executions such as priority levels 705 and 706 could be stored in the header of a tile, and could be pulled for substitution if the conditional execution system determined that the priority of the payload of the tile was very low. The predetermined values could be all zeros, white noise with a certain power level, or all constant values. The power level or constant values could be calculated during the execution of prior operations, or using a separate process that evaluates the tiles orthogonally to any execution of the directed graph. Specific implementations of priority levels 705 and 706 therefore represent a different class of conditional execution because the metadata is injected into the data flow of the execution as opposed to serving as an indication of a type of conditional execution that should be executed.

Prior to running computations that use data tiles, the processing core can inspect separate data associated with the payload of the tiles. The separate data can be the metadata of the tile. The processing core can then either execute the operations needed to implement the computations, reduce the precision of those operations, or provide a pre-computed approximation in place of the output from the standard execution of the operation. In a specific combination of the approaches described above, prior executions tag data tiles with metadata indicating the tiles are of "high," "medium," or "low" importance. Then during a later conditional execution the computations tagged "low" are suppressed entirely, while the precision of the operations involving the "high" and "medium" importance tiles are optimized between two different levels selected from 4-bit, 8-bit, and 16-bit precision. Such an approach could potentially provide performance enhancements by a factor of 2-3 times a reduction in work required for the execution of a given ANN while receiving the same output for any inference across the input space of the ANN.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. The data structures used to implement the weights, accumulation values, filters, inputs, outputs, etc. of the systems described herein can all be four dimensional or five dimensional tensors. In particular, the data elements stored in the tiles could store at least portions of four and five dimensional tensors. The directed graph and the simplified version of the directed graph described herein could be wholly different structures implemented in memory. Although examples in the disclosure were generally directed to machine intelligence systems, the same approaches could be utilized to any computationally intensive application involving the execution of a directed graph. Although examples in the disclosure were generally directed to ANNs, the same approaches could be utilized to enhance the operation of support vector machines, neuromorphic hardware generally, and any deep learning approach involving a complex set of layers. These and other modifications and variations to the present invention may be practiced by those skilled in the art, without departing from the scope of the present invention, which is more particularly set forth in the appended claims.

What is claimed is:

1. A processing core comprising:
   a memory;
   a first data tile stored in the memory, wherein the first data tile includes a first set of data elements from a directed graph, and wherein the first data tile is a first tensor storage container;
   metadata: (i) relationally stored in a header of the first data tile in the memory; and (ii) generated in a prior execution of the directed graph or a prior simplified execution of the directed graph;
   a second data tile stored in the memory, wherein the second data tile includes a second set of data elements, and wherein the second data tile is a second tensor storage container;
   an arithmetic logic unit;
   an instruction, wherein execution of the instruction uses: (i) the arithmetic logic unit; (ii) a first data element in the first set of data elements; and (iii) a second data element in the second set of data elements;
   a control unit that conditions execution of the instruction using the metadata;
   wherein a standard execution of the instruction, using the arithmetic logic unit, generates a standard output;
   wherein a conditional execution of the instruction, using the arithmetic logic unit, generates a conditionally executed output; and
   wherein the conditional execution of the instruction is a replacement of the standard output with a fixed value.

2. The processing core of claim 1, further comprising:
   runtime hardware that updates the metadata based on the execution of the instruction.

3. The processing core of claim 1, further comprising:
   second metadata relationally stored in a second header of the second data tile;
   wherein the control unit conditions execution of the instruction using the metadata and the second metadata.

4. The processing core of claim 1, wherein:
   the instruction is part of a standard instruction sequence for the directed graph; and
   the metadata is generated during an execution of the standard instruction sequence by the processing core.

5. The processing core of claim 1, wherein:
   the first set of data elements and the second set of data elements are both directed graph data for the execution of a neural network; and
   the first and second data tiles are both smaller than a layer of the neural network and larger than a single neuron's weight value.

6. The processing core of claim 1, wherein:
   the instruction is one of a matrix multiplication and a convolution.

7. The processing core of claim 1, wherein:
   the control unit conditions execution of the instruction using the metadata in that the control unit conducts an analysis of the metadata to condition the execution of the instruction.

8. The processing core of claim 1, wherein:
   the control unit conditions execution of the instruction using the metadata in that the control unit injects the metadata into a dataflow of the execution of the instruction.

9. The processing core of claim 1, further comprising:
   a software controller that sets a data size of the first data tile.

10. The processing core of claim 1, wherein:
    the metadata includes one of a power value, a mean and variance, and an approximate spectrum of the first set of data elements.

11. The processing core of claim 1, wherein:
    the metadata is an approximation of the first set of data elements.

12. A processing core comprising:
    a memory;
    a first data tile stored in the memory, wherein the first data tile includes a first set of data elements from a directed graph, and wherein the first data tile is a first tensor storage container;
    first metadata: (i) relationally stored with the first data tile in the memory; and (ii) generated in a prior execution of the directed graph or a prior simplified execution of the directed graph;
    a second data tile stored in the memory, wherein the second data tile includes a second set of data elements, and wherein the second data tile is a second tensor storage container;
    second metadata relationally stored with the second data tile;
    an arithmetic logic unit;
    an instruction, wherein execution of the instruction uses: (i) the arithmetic logic unit; (ii) a first data element in the first set of data elements; and (iii) a second data element in the second set of data elements;
    a control unit that conditions execution of the instruction using the first metadata and the second metadata;
    wherein a standard execution of the instruction, using the arithmetic logic unit, generates a standard output;

wherein a conditional execution of the instruction, using the arithmetic logic unit, generates a conditionally executed output; and wherein the conditional execution of the instruction is less computationally intensive than the standard execution of the instruction.

13. The processing core of claim 12, further comprising:
runtime hardware that updates the first metadata based on the execution of the instruction.

14. The processing core of claim 12, wherein:
the instruction is part of a standard instruction sequence for the directed graph; and
the first metadata is generated during an execution of the standard instruction sequence by the processing core.

15. The processing core of claim 12, wherein:
the first set of data elements and the second set of data elements are both directed graph data for the execution of a neural network; and
the first and second data tiles are both smaller than a layer of the neural network and larger than a single neuron's weight value.

16. The processing core of claim 12, wherein:
the control unit conditions execution of the instruction using the first metadata and the second metadata in that the control unit conducts an analysis of the first metadata and the second metadata to condition the execution of the instruction.

17. The processing core of claim 12, wherein:
the control unit conditions execution of the instruction using the first metadata and the second metadata in that the control unit injects the metadata into a dataflow of the execution of the instruction.

18. The processing core of claim 12, wherein:
the instruction is one of a matrix multiplication and a convolution.

19. The processing core of claim 12, further comprising:
a software controller that sets a data size of the first data tile.

20. The processing core of claim 12, wherein:
the first metadata includes one of a power value, a mean and variance, and an approximate spectrum of the first set of data elements.

21. The processing core of claim 12, wherein:
the first metadata is an approximation of the first set of data elements.

22. A processing core comprising:
a memory;
a first data tile stored in the memory, wherein the first data tile includes a first set of data elements from a directed graph, and wherein the first data tile is a first tensor storage container;
metadata: (i) relationally stored with the first data tile in the memory; and (ii) generated in a prior execution of the directed graph or a prior simplified execution of the directed graph;
a second data tile stored in the memory, wherein the second data tile includes a second set of data elements, and wherein the second data tile is a second tensor storage container;
an arithmetic logic unit;
an instruction, wherein execution of the instruction uses: (i) the arithmetic logic unit; (ii) a first data element in the first set of data elements; and (iii) a second data element in the second set of data elements;
a control unit that: (i) conditions execution of the instruction using the metadata; and (ii) updates the metadata based on the execution of the instruction;
wherein a standard execution of the instruction, using the arithmetic logic unit, generates a standard output;
wherein a conditional execution of the instruction, using the arithmetic logic unit, generates a conditionally executed output; and
wherein the conditional execution of the instruction is less computationally intensive than the standard execution of the instruction.

23. The processing core of claim 22, further comprising:
runtime hardware that updates the metadata based on the execution of the instruction.

24. The processing core of claim 22, wherein:
the instruction is part of a standard instruction sequence for the directed graph; and
the metadata is generated during an execution of the standard instruction sequence by the processing core.

25. The processing core of claim 22, wherein:
the first set of data elements and the second set of data elements are both directed graph data for the execution of a neural network; and
the first and second data tiles are both smaller than a layer of the neural network and larger than a single neuron's weight value.

26. The processing core of claim 22, wherein:
the control unit conditions execution of the instruction using the metadata in that the control unit conducts an analysis of the metadata to condition the execution of the instruction.

27. The processing core of claim 22, wherein:
the control unit conditions execution of the instruction using the metadata in that the control unit injects the metadata into a dataflow of the execution of the instruction.

28. The processing core of claim 22, wherein:
the instruction is one of a matrix multiplication and a convolution.

29. The processing core of claim 22, further comprising:
a software controller that sets a data size of the first data tile.

30. The processing core of claim 22, wherein:
the metadata includes one of a power value, a mean and variance, and an approximate spectrum of the first set of data elements.

31. The processing core of claim 22, wherein:
the metadata is an approximation of the first set of data elements.

* * * * *